United States Patent Office 3,412,466
Patented Nov. 26, 1968

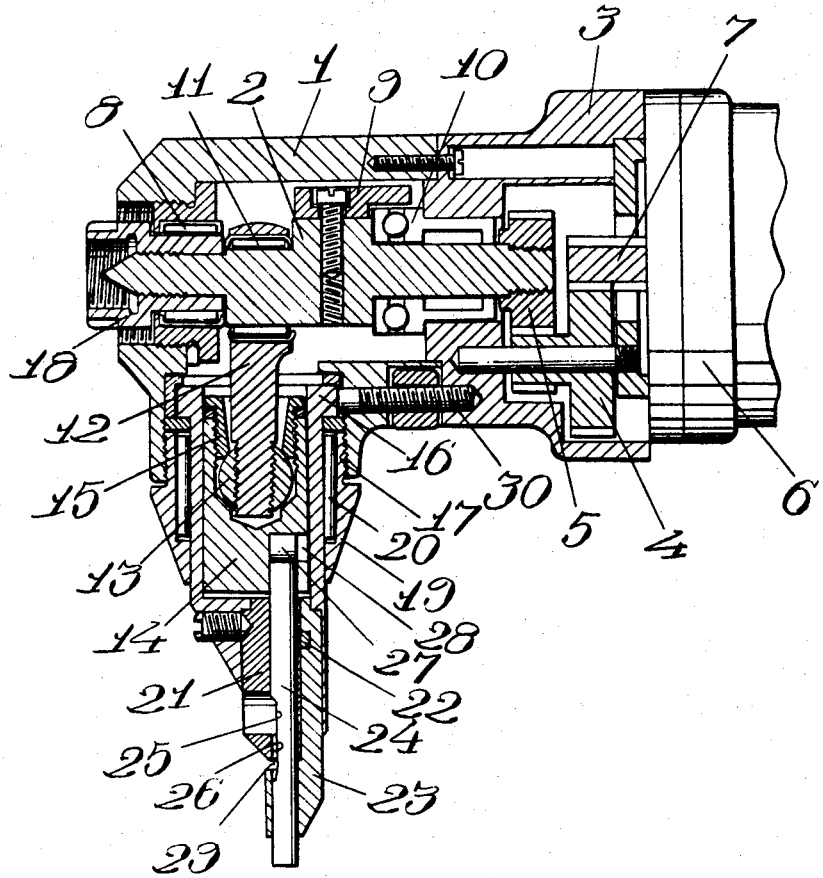

3,412,466
HANDY ELECTRIC SHEAR
Kiichiro Kurosaki, 25 Azabu Imai-cho,
Minato-ku, Tokyo, Japan
Filed Nov. 22, 1966, Ser. No. 596,235
Claims priority, application Japan, Nov. 26, 1965,
40/72,263
2 Claims. (Cl. 30—228)

ABSTRACT OF THE DISCLOSURE

An electric shear for shearing sheet iron comprising two cutting blades, one fixed with respect to the other, and the other driven by means of a motor to move axially within the first blade to shear sheet iron.

Background of the invention

*Field of the invention.*—This invention relates to a handy electric shear, and more particularly, to a handy electric shear for shearing sheet iron, synthetic resin sheet, or the like, provided with a movable blade mounted for free rotation relative to its body member and a fixed blade mounted encircling said movable blade.

*Description of prior art.*—While a variety of hand-operated shears on cutters for shearing or cutting sheet iron, or the like, have been developed, the construction of such conventional shears or cutters usually allows its pair of shears to move in a predetermined direction relative to its body member, which has presented some difficulty to perform cutting or shearing operation along a desired curve. To cite an instance, when a passenger car is fitted with a refrigerator, a circular port for passage of cooling air has to be bored in the panel board behind the rear seat of the passenger car. In such an instance, a plurality of small size holes are drilled first of all along a predetermined circumference by means of a drill, and a circular port is then bored, by means of a hack saw, along a circular line interconnecting these drilled holes, and finished by filing.

Summary of the invention

According to the shear of the present invention, the center of the circular exhaust port to be bored and a point on its circumference are drilled by means of a drill, and the center of the rod ruler is inserted in the drilled center hole. Since the movable blade is mounted freely rotatably in the desired direction, an exhaust port may be bored in the panel board to a true circular shape by having the one end of the rod ruler attached to the shear or cutter proper and by having the said movable blade inserted in the drilled hole on the circumference of the exhaust port to be bored and moved circularly along said circumference for boring the port.

Hence, the present invention has for its primary object to provide a hand-operated electric shear having a movable blade mounted for vertical reciprocating motion and a fixed blade mounted encircling said movable blade, said movable and fixed blades being mounted freely rotatably relative to their support fixture.

With these objects in view and other objects hereinafter set forth, the present invention will be described in detail with reference to a drawing showing an embodiment thereof.

Brief description of the drawing

The accompanying drawing illustrates, in partly cut side elevation, a shear according to the present invention.

Description of the preferred embodiment

A crank shaft 2 mounted inside a forward casing member 1 is rotated by means of a driving shaft 7 of an electric motor (not shown) mounted inside a rear casing member 6 via gears 4 and 5 mounted inside an intermediary casing member 3. Said crank shaft 2 is carried for free rotatory motion inside the forward and intermediary casing members 1 and 3 by means of a bearing 8 mounted near the foremost part of the forward casing member 1, a balance 9 threaded to one side of the crank shaft 2, and thrust bearings 10.

To this crank shaft 2 is fitted a rod 12 by means of a crank bearing 11, and a ball bearing 13 is threadedly secured to the free end of the rod 12. Said ball bearing 13 is secured inside a piston 14 by means of a threaded nut 15 closing the upper open end of the piston 14. Thus piston 14 is free to rotate as it is swivelly connected to rod 12.

With rotation of the crank shaft 2, said piston 14 is reciprocated in the vertical direction inside the cylinder 16, the latter being supported rotatably via a roll bearing 20 in the inside of an outer tubular member 19 threaded to an opening 17 provided on one side of said forward casing member 1 coaxially with said rod 12 and the piston 14 therein. A fixed blade member 21 is threadedly mounted to the cylinder 16 and a guide member 23 is keyed to the fixed blade member 21 by means of a key 22 so as to guide the cutting edge 25 of the vertically reciprocable blade member 24 in abutting relation with the cutting edge 26 of the fixed blade member 21. A head portion 27 provided on the side opposite to the cutting edge 25 of the movable blade member 24 is held removably in a step 28 provided to said piston 14.

Numeral 18 in the drawing indicates a front shaft threadedly mounted to the forward end of the crank shaft 2 and functioned to serve as a fixture for mounting a drill chuck when the shear is used as a drill. The rotation of the cylinder 16 can be restricted by fastening or releasing a screw 30.

In operation, a workpiece to be cut, such as a sheet of iron, is placed in a cutting position and an edge thereof is inserted in the opening 29 formed between the lower side of the cutting edge 26 of the fixed blade member 21 and the edge of the guide member 23. As the piston 28 is reciprocated in the vertical direction, with rotation of the crank shaft 2, the movable blade member 24 is also reciprocated in the vertical direction, and the workpiece is sheared by the cutting edge 25 of the movable blade member 24 and the cutting edge 26 of the fixed blade member 21. It will be noted that the cutting direction may be varied as desired inasmuch as the fixed blade member 21 is secured to the cylinder 16 and the latter in turn is supported freely rotatably inside the outer tubular member 19.

What is claimed is:
1. A handy electric shear comprising a casing, an electric motor mounted inside said casing, a crank shaft mounted inside said casing and rotated by means of said electric motor, a connecting rod carried at its one end to said crank shaft and adapted to be reciprocated with the rotation of said crank shaft, a piston rotatably swivelly secured to the other end of said rod and adapted to be reciprocated, with the reciprocating motion of said rod, in the inside of a cylinder provided on one side of said casing, a movable blade removably held by said piston and provided with a cutting edge formed with a recessed portion at the foremost part thereof, the foremost part being the front edge of the blade facing the direction of the work, a fixed blade secured to said cylinder and provided with a cutting edge facing the cutting edge of said movable blade, and guide member retained by said fixed blade and adapted to guide said movable blade vertically and in abutting relation to said fixed blade; said cylinder and piston being rotatably supported by said casing.

2. A handy electric shear as claimed in claim 1, wherein said connecting rod is retained by said piston through a ball bearing threadedly fitted to one end thereof.

References Cited

UNITED STATES PATENTS

| | | | |
|---|---|---|---|
| 2,142,620 | 1/1939 | Stanley | 30—275 |
| 2,201,599 | 5/1940 | Trautmann | 30—228 |
| 2,680,292 | 6/1954 | Kaufmann | 30—228 |
| 3,340,610 | 9/1967 | Hendrickson | 30—241 X |

ROBERT C. RIORDON, *Primary Examiner.*

J. C. PETERS, *Assistant Examiner.*